United States Patent Office
3,702,354
Patented Nov. 7, 1972

3,702,354
METHOD FOR PREPARING POLYBUTADIENE ACRYLONITRILE PROPELLANT AND EXPLOSIVE MATERIALS AND PRODUCTS THEREOF
James P. Diebold and Judson B. Eldridge, China Lake, Calif., assignors to the United States of America as represented by the Secretary of the Navy
No Drawing. Filed Feb. 20, 1970, Ser. No. 18,030
Int. Cl. C06d 5/06
U.S. Cl. 264—3 D     8 Claims

ABSTRACT OF THE DISCLOSURE

A process for the rapid production of filled polybutadiene acrylonitrile formulations which form well consolidated shapes having uniform strength which, briefly, comprises preparing a gel by mixing the polybutadiene acrylonitrile rubber in a suitable solvent, adding a rubber crosslinker, plasticizer or vulcanizing agent; stirring in a filler such as salts, metals, carbon black, etc., extracting the solvent; pouring the product into drying trays; and drying at room temperature. The product is ready to be extruded or block-pressed into various predetermined shapes.

GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a method for rapid production of filled polybutadiene acrylonitrile (PBAN) formulations and to the product thereof.

Prior methods of producing articles having a rubber binder comprises adding a solvent to the rubber to lower the viscosity of the mix, then adding salts, metals, etc., to form the desired composition. The resultant mixture is then extruded into very small diameter strands and the solvent is allowed to migrate out of the strands. When the solvent migrates out, the strand shrinks in size and/or voids are formed. Such a strand usually needs to be extruded again before it would be usable. The drying process often forms closed-cell porosity which results in a product having an unacceptably low density. Processing rubber-based propellants by this method has met with very limited success. The present invention provides a simple and economical means for producing superior propellant, flare and explosive formulations which are safer than those of the extruded homogeneous and fluorocarbon types being used today.

DESCRIPTION OF THE INVENTION

In accordance with the present invention a gel is formed by mixing polybutadiene acrylonitrile in a suitable solvent such as acetone, methylethylketone, ethylacetate, etc. To this gel the conventional rubber crosslinking agents, plasticizers or vulcanizing agents may be added. Solid ingredients such as metals, inorganic and organic salts, fluorocarbons such as polytetrafluoroethylene (PTFE) and copolymer of vinylidene difluoride and hexafluoropropylene, carbon black, graphite and other fillers are added to the gel to form a slurry. The solvent for the polybutadiene acrylonitrile is next extracted from the slurry by washing with hexane, heptane, water, etc. The extracting solution is limited by the requirement that it be able to extract the solvent from the rubber, but not dissolve the rubber or the solids loaded in the rubber. As the rubber droplets lose the solvent, they become tacky and begin to collect particles. The extraction of acetone from the rubber droplets proceeds relatively slowly which allows the tacky droplets time to collect all of the solids from the slurry. The slurry may be washed with extracting solvent several times because the more solvent extracted from the rubber phase, the more discrete are the particles in the final product. The solvent is decanted and the product is poured into the desired shape and dried at room temperature and pressure. Discrete particles can be formed and can be a free flowing material for drying. Elevated temperature and/or a partial vacuum may be used to hasten drying, but are not necessary. The product is then ready for ignition powder as is or for conventional extrusion, pressing, or rolling processes.

By this process the product may contain as low as 5% by weight rubber. The only factor which limits the size of the finished product is the processing equipment.

The following examples will better illustrate the invention but should not be considered as limiting it.

EXAMPLE I

A quantity, 8 pounds of polybutadiene acrylonitrile (PBAN) was placed in a 50 gallon mixing kettle and mixed with 12 gallons of acetone until a gel formed. (If curing agents are used, they are added mixed into the acetone with the PBAN.) About 34 pounds of ammonium perchlorate and 8 pounds of aluminum (8–10μ) were added and thoroughly stirred into the gel to form a slurry. Hexane was next added slowly to the kettle in a volume of about three times the amount of acetone used. Hexane extracts the acetone from the mixture without dissolving the rubber or solids (oxidizer and metal) loaded in the rubber. The mixture appeared to gradually change its characteristics. Gradually the rubber came out of solution to coat the particles. As the rubber droplets lose the acetone solvent, they become tacky and agglomerate. The mixer was stopped and the solids allowed to settle for about half an hour. The hexane-acetone solution was decanted. The mixer was started again and hexane again added. After a few minutes of agitation, the mix was allowed to settle. After this second hexane addition, the mix particles had agglomerated such that the mix settled in a few minutes. The agglomeration of the particles has been found not to be a function of mix time, but whether or not it has been allowed to settle previously. The excess hexane-acetone is decanted. The resultant propellant slurry has the consistency of sandy mortar and can be poured into molds if desired. Because of the unique properties of the product, the solvent is easily removed from the molded propellant. The propellant slurry forms an open porous structure upon drying which is accomplished at ambient conditions. The ease of removing the processing solvents from the propellant is one of the very important features of this process. The removal of the solvents prior to extrusion allows the propellant to be dimensionally stable when extruded. The propellant does not expand due to trapped solvents vaporizing after extrusion, and the density of the propellant made by this method is not lowered by the formation of gas pockets by trapped solvent vaporizing.

EXAMPLE II

Ingredients: Percent by weight
Polybutadiene acrylonitrile (PBAN) _____ 13.5
Ammonium perchlorate _____ 69.5
Aluminum _____ 17.0

The above ingredients were mixed in accordance with the procedure set forth in Example I, using acetone to form the gel with PBAN and washing the slurry with hexane. The product was pressed into a series of propellant grains. The product had a density of 1.771 g./cc., heat of explosion 1632 cal./gram, and burning rate at 1000 p.s.i. of .353 in./sec. The tensile strength (Sm) was 362 p.s.i. and the elongation at maximum tensile was 3.8%.

A 300 pound extrusion of the above formulation on a 15 inch press successfully demonstrated this method of preparing low-cost extruded propellants having a high energy content is feasible. The propellant is very uniform and did not significantly vary from mix to mix.

EXAMPLE III

Ingredients: Percent by weight
Polybutadiene acrylonitrile _____ 16.5
Ammonium perchlorate _____ 67.25
Aluminum _____ 16.25

The same procedure described in Example I was used to process the above ingredients which produced discrete free flowing particles after drying.

EXAMPLE IV

Ingredients: Percent by weight
Polybutadiene acrylonitrile (PBAN) _____ 11.5
Ammonium perchlorate _____ 68.75
Aluminum _____ 16.75
Polymeric plasticizer _____ 3.0

The ingredients were processed in accordance with the procedure described in Example I wherein acetone was used as the solvent for PBAN and hexane was used to extract the acetone from the slurry. The product was pressed into a grain. The plasticizer was "Harflex," a trade name for a high molecular weight polymeric-type plasticizer which aided in processing the ingredients into an extrudable product. Measurements were made of the tensile strength (Sm) and elongation at maximum tensile (Em) of a 0.2 inch strand. The values were 202 p.s.i. tensile strength and 1.8% elongation at maximum strength.

EXAMPLE V

Ingredients: Percent by weight
Polybutadiene acrylonitrile _____ 10
Ammonium perchlorate _____ 70
Aluminum _____ 20

The ingredients were processed as in Example I and the resulting product was a free flowing powder which can be used as an ignition powder. It can also be extruded or block pressed. The density was 1.826 g./cc., the heat of explosion was 1853 cal./gram, and the burning rate at 1000 p.s.i. was 0.616 in./sec.

EXAMPLE VI

The same ingredients as set out in Example V were processed with the addition of 5% of the cellulose acetate, and only 5% of the PBAN rubber. This material was pressed into a grain.

EXAMPLE VII

Ingredients: Percent by weight
Polybutadiene acrylonitrile _____ 12
Cyclotetramethylenetetranitramine (HMX) ____ 88

The polybutadiene acrylonitrile was placed in a mixing kettle with ethyl acetate and stirred until a gel formed. The HMX was added and thoroughly stirred into the gel to form a slurry. The slurry was washed with water in an amount of about three times the amount of ethyl acetate used. The product when dried is a free flowing explosive powder and was pressed into billets.

EXAMPLE VIII

Ingredients: Percent by weight
Polybutadiene acrylonitrile (PBAN) _____ 10
Polytetrafluoroethylene (Teflon) _____ 32
Magnesium _____ 58

The ingredients were processed as in Example I using acetone as a solvent for the PBAN to form a gel. The Teflon and magnesium powder were added to the gel to form a slurry which was washed slowly many times with hexane to extract the acetone. As the material loses the acetone solvent, it becomes tacky and begins to collect the solid particles. After the final washing with hexane, the hexane was decanted off and the resulting particles dried under ambient conditions. This product was pressed into a series of predetermined shapes for flare application. Measurements were made of the tensile strength and elongation at maximum tensile with the following results for a 0.2 inch strand: 1080 p.s.i. tensile strength (Sm) and 17% elongation at maximum (Em). The product has a density of 1.704 g./cc. and a burning rate at 1000 p.s.i. of 0.19 in./sec.

EXAMPLE IX

Ingredients: Percent by weight
Polybutadiene acrylonitrile (PBAN) _____ 12
Polytetrafluoroethylene (Teflon) _____ 30
Copolymer of vinylidene difluoride and hexafluoropropylene (Viton) _____ 4
Magnesium (powder) _____ 54

The PBAN was placed in a mixing kettle and mixed with a quantity of acetone and stirred to form a gel. The Teflon and Viton were blended into the gel and thoroughly mixed, then the magnesium was added to form a slurry. The slurry was next washed with hexane in a volume of about three times the amount of acetone used. Hexane extracts the acetone from the slurry. The slurry is washed at least three times. The more solvent (acetone) extracted, the more discrete are the particles in the final product. After final washing the resulting particles were dried and pressed into pellets.

The addition of Viton improves the processability, but the material is relatively expensive. "Harflex," a trademark for a line of polymeric plasticizers for vinyl resins, synthetic rubbers and cellulose esters has been used as an alternative. It is less expensive and operates as a processing aid whereby extrudability is improved.

The product has a density of 1.59 g./cc. and heat of explosion of 1157 cal./gram. Measurements of tensile strength and elongation at maximum tensile strength of a 0.2 inch strand are as follows: Sm 784 p.s.i. and Em 11%.

EXAMPLE X

Ingredients: Percent by weight
Polybutadiene acrylonitrile (PBAN) _____ 15.5
Ammonium perchlorate _____ 68
Aluminum _____ 16.5

The above ingredients were processed in accordance with Example I. The product was pressed into a propellant grain. Measurements were made of the tensile strength and elongation at maximum tensile. The results of a strand ½" x 1" were as follows: Sm 355 p.s.i. and Em 5.3%.

If only a little of the acetone is allowed to remain in the rubber phase, a granular product will result. If more of the acetone is allowed to remain in the rubber phase until the drying step, the product may be cast into a desired shape and an open-celled porous structure will be formed which is easy to dry. If too much of the acetone is allowed to remain in the rubber phase until the drying step, the product will be difficult to dry.

Some of the many possible solvent combinations include but are not limited to hexane-acetone, heptane-acetone, water-acetone, water-methylethylketone, ethyl acetate - alcohol, trichloroethylene - alcohol, and hexane-methylisobutylketone.

The use of crosslinkers to cure the rubber after extruding, pressing, or rolling is optional as the uncured strength of the filled rubber is quite good. Such curing agents as zinc oxide, zinc dimethyldithiocarbonate, mercaptobenzothiazole and sulfur-based vulcanizing agents were used with success.

The rubber material used herein is readily available commercially and can be readily compounded with the proper formulations to produce propellants, explosives

What is claimed is:

1. A method for preparing filled polybutadiene acrylonitrile-based formulations having an open porous structure, the steps comprising:
   (1) forming a gel by mixing from about 5 to 25% by weight polybutadiene acrylonitrile in a solvent for said polybutadiene acrylonitrile selected from the group consisting of acetone, methylethylketone, methylisobutylketone, ethyl acetate and trichloroethylene;
   (2) stirring into said gel up to 95% by weight of a solid ingredient to form a slurry; said ingredient being selected from the group consisting of metals, high explosives, oxidizers, fluorinated polymers, graphite, carbon black, cellulose acetate, polymeric plasticizers, and mixtures thereof;
   (3) washing said slurry with a member selected from the group consisting of water, hexane, heptane, and alcohol and in a volume equal to about three times the amount of said solvent for polybutadiene acrylonitrile whereby said solvent is removed leaving tacky droplets of polybutadiene acrylonitrile loaded with the solids from said slurry; and
   (4) drying said loaded droplets under ambient conditions.

2. The method of claim 1 wherein said solid ingredients consist essentially of from about 65 to 90% by weight ammonium perchlorate and from about 5 to 20% by weight aluminum.

3. The method of claim 1 wherein said solids consist essentially of from about 25–35% by weight polytetrafluoroethylene and from 45 to 75% by weight magnesium.

4. The method of claim 1 wherein said solids consist essentially of about 30% by weight polytetrafluoroethylene, about 54% magnesium and about 4% by weight of the copolymer of vinylidene difluoride and hexafluoropropylene.

5. The product of claim 1.
6. The product of claim 2.
7. The product of claim 3.
8. The product of claim 4.

References Cited
UNITED STATES PATENTS 3,269,880  8/1966  Visnov et al. _____ 149—92 X
3,102,833  9/1963  Schulz _____ 149—19

BENJAMIN R. PADGETT, Primary Examiner

U.S. Cl. X.R.

149—19, 20, 44; 264—3 C